United States Patent [19]

Kubota

[11] Patent Number: 4,500,373

[45] Date of Patent: Feb. 19, 1985

[54] PROCESS FOR PRODUCING COINCIDENTLY EMBOSSED DECORATIVE SHEETS

[75] Inventor: Hajime Kubota, Kyoto, Japan

[73] Assignee: Dai Nippon Insatsu Kabushiki Kaisha, Japan

[21] Appl. No.: 374,744

[22] Filed: May 4, 1982

[30] Foreign Application Priority Data

Sep. 29, 1981 [JP] Japan ............................... 56-154084
Feb. 8, 1982 [JP] Japan ............................... 57-18539

[51] Int. Cl.[3] ........................ B32B 5/18; B32B 31/00; B29H 7/20; D06N 7/04

[52] U.S. Cl. ........................................ 156/79; 156/83; 156/154; 156/267; 156/277; 264/48; 427/336; 51/324; 428/151

[58] Field of Search ................. 156/83, 153, 154, 267, 156/78, 79, 222, 277, 289; 428/156, 158, 172, 160, 159, 151; 51/323, 324, 325, 326, 310, 311; 264/161, 162, 343, DIG. 82, 48, 136, 55, 54; 427/289, 336, 368

[56] References Cited

U.S. PATENT DOCUMENTS

| | | | |
|---|---|---|---|
| 3,798,098 | 3/1974 | Ogawa et al. | 156/154 |
| 3,976,524 | 8/1976 | Feng | 427/336 |
| 4,064,301 | 12/1977 | Howard | 264/162 |

FOREIGN PATENT DOCUMENTS

| | | | |
|---|---|---|---|
| 54-111554 | 8/1979 | Japan . | |
| 56-101815 | 8/1981 | Japan | 264/48 |
| 57-146631 | 9/1982 | Japan | 264/55 |

*Primary Examiner*—Edward C. Kimlin
*Assistant Examiner*—Louis Falasco
*Attorney, Agent, or Firm*—Parkhurst & Oliff

[57] ABSTRACT

First, a decorative sheet is produced by forming in sequence on a base paper such as titanium paper an ordinary printed layer and a heat-foamable printed layer, respectively with desired patterns. The decorative sheet is then impregnated with a thermosetting resin liquid and dried. The dried impregnated decorative sheet is superposed on a substrate such as a core sheet, and the resulting laminated structure is sandwiched between a pair of heating plates and heated and pressed whereby a thermoset integral structure with the pattern of the foamable printed layer foamed is produced. The entire surface of the integral structure is coated with a solvent to swell the foamed pattern layer and then rubbed to remove the swollen foamed pattern layer and form concavities thereat. The resulting thermoset resin decorative sheet or plate is provided with deep distinct concavities coincident with the pattern of the heat-foamable printed layer as well as a good surface luster.

10 Claims, 9 Drawing Figures

PROCESS FOR PRODUCING COINCIDENTLY EMBOSSED DECORATIVE SHEETS

BACKGROUND OF THE INVENTION

The present invention relates to a process for producing a decorative sheet or plate having a concave pattern which is in coincidence with a design or color pattern.

Several methods of forming concavities and especially concavities coincidently matching printed patterns on thermosetting resin decorative sheets such as melamine decorative sheet and diallyl phthalate decorative sheet have been known. One method uses a printing step wherein the coincident matching of the portions for producing concavities with other pattern portions can be conducted in the printing step. Moreover, this method using a printing step is industrially advantageous in that the ordinary processing steps can be substantially applied after the printing step, in comparison with other methods such as a method using a mold or the like which has a surface structure in conformity with the printed pattern.

One method for forming concavities, using a printing step, for producing coincidently embossed concave-convex decorative sheets is set out in Japanese Patent Laid-Open Application No. 111554/1979. This method is characterized by the steps of forming an ordinary printed layer of a desired design pattern with an ordinary printing ink on a paper for decorative use; forming thereon a foamable printed layer having a desired pattern with a heat-foamable printing ink; impregnating the decorative paper on which the above mentioned two printed layers have been formed with a thermosetting resin and drying the printed paper to form an impregnated paper; laminating the impregnated paper on a substrate; and then subjecting the laminate to a molding treatment by heating and pressing. During the molding by heating and pressing, the foamable printed layer undergoes foaming, and poor setting occurs in the thermosetting resin around the foamed portions. As a result, when a mirror plate used upon heating and pressing is peeled off, the poorly set portions sticking to the mirror plate are removed to form concavities coincident with the printed pattern.

However, there are some problems in this process. The concavities formed according to the above described process are produced because of the failure in cohesion due to the decrease in cohesion strength in the poorly thermoset resin and the foamed portions. Such failure in cohesion is rather accidental, but the result is that distinct concavities corresponding to the foamed printed layer cannot always be formed and only mat portions may be formed. Another, problem with this process develops when the stained mirror plate is repeatedly used for the step of molding by heating and pressing, in that the uncured resin adheres to the mirror plate, and thus a decorative sheet product having uneven gloss surface may be produced.

An object of the present invention is to provide a process for producing a thermosetting resin decorative sheet having distinct concavities in coincidence with a printed pattern by eliminating the above described problems that occur in the conventional processes for production of thermosetting resin decorative sheets.

SUMMARY OF THE INVENTION

The above stated objects of the present invention can be achieved by carrying out the steps up to the step of molding by heating and pressing as substantially disclosed in the Japanese Patent Laid-Open Application No. 111554/1979. However the instant application calls for the application of a coating, a solvent, on the decorative sheet and then rubbing or polishing the coated surface to remove the foamed printed layer which has been swollen by the solvent. This method of treating the sheet results in selective swelling with solvent of the foamed printed portions remaining on the surface of the decorative sheet after the step of molding by heating and pressing. These selectively swollen portions can then be removed by rubbing the decorative surface and thereby obtaining distinct concavities.

Thus, the process for producing a thermosetting resin decorative sheet in accordance with the present invention comprises the steps of:

forming in sequence on a paper for decorative use an ordinary printed layer having a desired pattern and then a heat-foamable printed layer having a desired pattern, impregnating the layered product with a thermosetting resin liquid, drying the impregnated sheet;

laminating the resulting impregnated decorative sheet on a substrate;

sandwiching the resulting laminated sheet between a pair of heating plates and molding the laminated sheet by heating and peeling the mirror prior to pressing, so that the laminated sheet is integrated by curing of the thermosetting resin, and simultaneously creating a foamed printed layer by foaming of the foamable printed layer;

applying as a coating a solvent onto the entire surface of the resulting laminated decorative sheet; and rubbing the surface to remove the foamed printed layer swollen by the solvent thereby producing a decorative sheet with a concave pattern coincident with a printed design or color pattern.

BRIEF DESCRIPTION OF THE DRAWING

In the drawing:

FIG. 1 shows an example of a decorative sheet to be used;

FIG. 2 shows an example of an impregnated sheet;

FIG. 3 shows an example of a step of molding by heating and pressing;

FIG. 4 shows an example of an integrated laminated sheet;

FIG. 5 shows an example of the sheet after coating with a solvent;

FIG. 6 shows a decorative sheet after rubbing;

FIG. 7 shows another example of the molding step;

FIG. 8 shows another example of a decorative sheet; and

FIG. 9 shows another example of a decorative sheet product.

DETAILED DESCRIPTION OF THE INVENTION

The process for producing thermosetting resin decorative sheets according to the present invention will become more clearly apparent from the following detailed description when read in conjunction with the accompanying drawings. Throughout the following description, all quantities expressed in "percent" and "part" are by weight unless otherwise specified.

Figure 1:
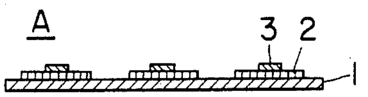
FIGS. 1 through 9 are schematic sectional views taken along planes perpendicular to the plane of a decorative sheet for a description of the process for producing the present decorative sheets. More specifically.

FIG. 1 shows the general constitution of a decorative sheet A to be used in the present invention. This decorative sheet A can be obtained by forming an ordinary printed layer having a desired pattern on a paper for decorative use 1 with an ordinary printing ink and then forming thereon a foamable printed layer 3 having a desired pattern with a heat-foamable printing ink.

For the paper 1 for decorative use, any paper to be used for conventional melamine decorative sheets or diallyl phthalate decorative sheets, such as a titanium paper composed of refined pulp with a large amount of titanium dioxide contained therein, can be used. Ordinary printing ink with suitable vehicle can be used, but an ink having a good impregnability with respect to the under mentioned thermosetting resins is preferred. Examples of preferred vehicles are cellulose derivatives such as ethylcellulose, ethyl-hydroxyethyl-cellulose, cellulose acetate propionate, nitrocellulose, and cellulose acetate, as well as butyral resins.

Formation of a desired pattern on the ordinary printed layer 2 with the ordinary printing ink can be carried out by a conventional printing method such as gravure printing, gravure-offset printing, offset lithography, direct lithography, intaglio printing, jet printing, silkscreen printing, and electrostatic printing. In the case of forming an ordinary printed layer having a wood grain pattern, it is preferred to use gravure or gravure-offset printing where a gravure printing roller engraved in an endless wood grain pattern is used. In the alternative, rotary screen printing, or the like can be used, but the printing method of the present invention is not restricted to any of these described processes.

As regards the heat-foamable printing ink used on the foamable printed layer 3, said ink can be prepared by adding 10 to 50 parts of a known foaming agent to 100 parts (as resin content) of a printing ink containing a suitable vehicle. Examples of suitable vehicles, in addition to the resins exemplified above as those for the ordinary printing ink, are styrene resins such as polystyrene and poly ($\alpha$-methylstyrene) and styrene copolymer resins; homo- or co-polymers of acrylic or methacrylic monomers; rosin, rosin ester resins such as rosin-modified maleic acid resin, rosin-modified phenolic resin and polymeric rosin; polyvinyl acetate resin; cumarone resin; vinyltoluene resin, vinyl chloride resin; polyester resin; polyurethane resin; polyamide resin; vinyl chloride-vinyl acetate copolymer resin; and mixtures thereof.

The foaming agent of the ink should be selected with consideration for the softening temperature of the vehicle in the ink, the processing condition of decorative paper, the characteristics of the known foaming agents used in the process. Foaming agents can be inorganic, organic, or microballoons and can include a member of the group of inorganic foaming agents such as sodium bicarbonate, ammonium carbonate, sodium boron hydride, and silicon oxyhydride; or organic foaming agents such as azodicarbonamide, azobisisobutyro nitrile, dinitrosopentamethylene tetramine, p-toluenesulfonyl hydrazide, and 4,4′-oxybisbenzenesulfonyl hydrazide; or microballoons (or a microspheres) composed of synthetic resin capsules containing a gas or a low-boiling point organic solvent or the like.

In addition to the above described vehicle and foaming agent, the heat formable ink is prepared by adding thereto a coloring agent such as a dye or pigment, a plasticizer, a stabilizer, a surface active agent, a wax or grease, a drying agent, an auxiliary drying agent, a hardening agent, an emulsifier, a thickener, a filler, a dispersion agent, a solvent, a diluent, and the like. The mixture is then kneaded.

Conventional printing methods can be used for forming the desired pattern with heat foamable ink and a printed layer 3 as for forming the ordinary printed layer 2, but it is preferred to employ a printing method which transfers a relatively large amount of ink upon printing because the printed pattern expands with the foaming agents to form deeper concavities. In this respect, gravure printing, gravure-offset printing, intaglio printing, or silk screen printing is preferred. In the case of a process comprising forming a wood grain pattern as the ordinary printed layer, printing thereon a wood vessel pattern as the foamable printed layer, and further forming concavities at the vessel pattern portions, it is preferred to form the wood grain pattern (ordinary printed layer) and the wood vessel pattern (foamable printed layer) according to the same printing method because these layers can both be formed by the same printing machine and coincidently, these two patterns can be readily matched.

As with the pattern for the foamable printed layer 3 (besides the wood vessel pattern), any pattern desired for forming concavities among patterns of the ordinary printed layer can be produced on a printing roller and printed on the ordinary printed layer. For example, the desired pattern can be selected from optional portions of patterns having three-dimensional textures such as tile joints, peeling grains of wood, cracks in stones, leathers, and fabrics. The coating weight of the foamable printed layer 3 (on a dry basis with respect to all the layers herein) depends on the pattern to be formed. For example, in the case of a wood vessel pattern, the suitable range is about 1 to 10 $g/m^2$.

Figure 2:
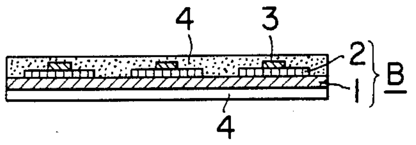

The decorative sheet A thus obtained is impregnated with a thermosetting resin liquid 4 and dried to produce an impregnated decorative sheet B as shown in FIG. 2.

As the thermosetting resin liquid, any of those thermosetting resins which are used in the production of conventional decorative sheets, such as melamine resin, phenolic resin, diallyl phthalate resin, benzoguanamine resin, epoxy resin, and thermoset-modified vinyl chloride resin can be used. The resin is dissolved in a suitable solvent or monomer depending on the necessity, and a catalyst and the like are added to form a resin liquid, which is then applied as a coating on and caused to impregnate the above described paper for decorative use by a conventional coating method such as gravure coating, roller coating, or dip coating.

The drying is carried out at a temperature lower than the curing temperature of the thermosetting resin 4. That is, the temperature depends upon the resin used. For example, it is suitable to conduct the drying at 90° to 140° C. for 1 to 10 minutes in the case of melamine resin. In this drying step, it does not matter that the heat-foamable printed layer 3 is partly foamed.

Figure 3:
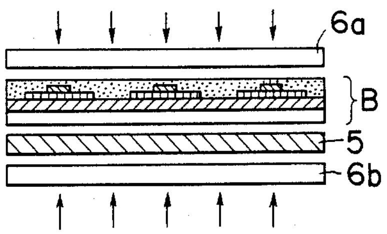

Next, the impregnated decorative sheet B thus obtained is superimposed on a substrate 5 as shown in FIG. 3, and the resulting combination is sandwiched between a pair of heating plates (mirror plates) 6*a*, 6*b* and thereby subjected to heating and pressing.

Examples of materials which can be used as the substrate 5 are a core paper (a laminated paper composed of a plurality of sheets of paper having a basis weight of 140 to 180 $g/m^2$ impregnated with 30 to 60% of phenolic resin); a wood substrate such as wood, plywood, or particle board; a gypsum substrate such as gypsum board or gypsum slag board; a fiber cement plate such as pulp cement plate, rock wool cement plate or wood piece cement plate; GRC or concrete; a foil or sheet of metal such as iron, aluminum, or copper; as well as a composite material of the above mentioned substrate. Especially in the case where the present process is applied to a high-pressure melamine laminate decorative sheet, it is preferred to use a substrate having a structure for production of the conventional melamine decorative sheet, for example, a substrate having a structure formed by superposing a plurality of sheets of core paper (basis weight of 140 to 180 g/m$^2$) impregnated with 30 to 60% of phenolic resin to a desired thickness and then supporting the laminate on a balance paper (basis weight of 80 g/m$^2$) impregnated with 60% of melamine resin.

In the general melamine decorative sheet, an overlay paper is superposed on an impregnated sheet. In the present invention, however, it is preferred not to use such an overlay paper because it hinders formation of the above mentioned concavities.

The conditions of heat and press molding depend on the thermosetting resin used. For example, in the case of melamine resin, the suitable conditions are in the ranges of about 130° to 140° C., about 80 to 120 Kg/cm$^2$, and about 10 to 30 minutes.

Figure 4:
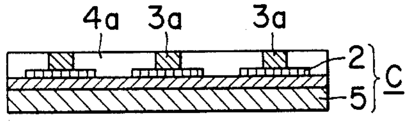

In the heat and press molding step, the foamable printed layer 3 is foamed and the thermosetting resin 4 is cured. When the heating plates 6*a*, 6*b* are separated, a foamed printed layer 3*a* is formed as shown in FIG. 4, and the product obtained is an integral cured laminate sheet C with a heat-cured resin layer 4*a* which has been partly pushed away by the foamed printed layer 3*a*.

Subsequently, the entire surface of the laminate sheet is coated with a solvent, whereby the foamed printed layer 3*a* absorbs the solvent and is swollen as shown by 3*b* in FIG. 5. The solvent to be used is a solvent which can dissolve or cause swelling of the foamed layer 3*a*. More specifically, for the solvent, a vehicle for the heat-foamable ink constituting the foamable printed layer 3, or a suitable solvent which can dissolve or cause swelling of capsule walls in the case where a microcapsule type foaming agent is employed can be used. For example, the solvent can be selected from aromatic hydrocarbons such as toluene and stylene; ketones such as acetone and methyl ethyl ketone; esters such as ethyl acetate and n-butyl acetate; alcohols such as methanol, ethanol and isopropanol; and halohydrocarbons such as trichloroethylene and tetrachloroethylene.

Coating of the decorative sheet with the solvent can be carried out by any optional coating method such as roller coating, spraying, casting, or flow coating.

Figure 5:
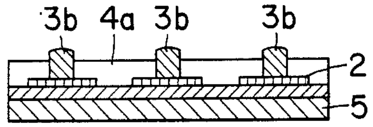

The surface of the resulting laminate sheet coated with a solvent in the form of FIG. 5 is rubbed by a suitable means such as a buff roller or brush, whereby the most of the swollen or dissolved foamed layer 3*b* is removed, a colored layer 3*c* due to the foamable ink being left only in the bottom, and the concavities 7 corresponding to the foamable printed layer 3 are formed. By using a so-called melton roller the surface of which is made of a fabric or the like held in a compact state, rubbing dust is conveniently removed.

Then a post-treatment such as heating or irradiation may be carried out as necessary to complete drying or curing.

In the above disclosure, the process for production of decorative sheets of the present invention has been described with respect to the most fundamental embodiment thereof. The process of the present invention can be modified as further described below with the corresponding improvements.

Modification 1

Figure 7:
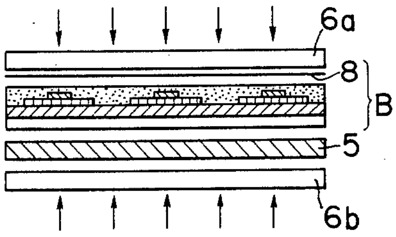

In accordance with the above described fundamental embodiment, the present process can be carried out to obtain a coincidently embossed decorative sheet having distinct concavities. Similar to the process described in Japanese Patent Laid-Open Application No. 111554/1979. However, an uneven gloss surface may sometimes form on the decorative sheet product when the mirror plate 6*a* is repeatedly used since the heat-curable resin on or near the foamed layer 3*a* adheres to the mirror plate 6*a* in the step of separating the mirror plates 6*a*, 6*b* as shown in FIGS. 3 and 4. To solve this problem, a method illustrated in FIG. 7, interposes between the mirror plate 6*a* and the impregnated decorative sheet, a disposable sheet 8 generally referred to as "release paper" having heat resistance and a smooth surface may be used, whereby the foamed resin or uncured resin adheres to the sheet 8 during the step of heating and pressing the decorative sheet B. Polyethylene terephthalate film, polypropylene film, aluminum foil, parchment paper, or a composite of the above materials can be used for the release paper.

Modification 2

The above mentioned soiling of the mirror plate and the resulting formation of uneven luster on the decorative sheet product can be remedied by modification 1. In accordance with this method, however, there are economic disadvantages in that a disposable sheet 8 is required and the insertion of the disposable sheet is troublesome.

Thus, Modification 2 is designed to produce a condition which does not cause adhesion of the foamed resin or the like onto the mirror plate even in the absence of the above mentioned disposable sheet. Adhesion of the foamed resin onto the mirror plate can be avoided by the use of a foaming agent with a foaming temperature in the vicinity of the heat- and press-molding temperature for curing the thermosetting resin. The term "in the vicinity of the heat-molding temperature" means a temperature in the range of the center value of the molding temperature for the thermosetting resin used (e.g., the center value 135° C. of the molding temperature range of 130° to 140° C. in the case of melamine resin). It is especially preferred to employ the range of the center value of the molding temperature minus 15° C. to minus 5° C. (120° to 130° C. in the case of melamine resin). The foaming temperature of a foaming agent is defined as the temperature at which substantial foaming commences. In the case of a microcapsule type foaming agent, the foaming temperature is generally similar to the softening temperature of the capsule-constituting resin.

Thus, the above mentioned adhesion of the resin to the mirror plate can be prevented by using a foaming agent of a foaming temperature in the vicinity of the molding temperature range. The reasons therefor have not been made clear however one possible reason is as follows: the foaming of the foaming agent upon molding is restricted in comparison with the case where a foaming agent of a lower foaming temperature is used, and the foamed layer pushes away the thermoset resin 4*a* to such a degree that the foamed layer can be impregnated with a solvent satisfactorily as shown in FIG. 4, but the foamed portion 3*a* is formed to such a degree that it does not protrude and adhere to the mirror plate.

Any foaming agent can be selected as long as it has a foaming temperature in the above mentioned range. The most preferred foaming agent, however, is of the microcapsule type from the viewpoint of readily controlling the foaming temperature range. In the microcapsule type foaming agent, the foaming temperature can be controlled by selecting the resin constituting the capsule wall and the volatile substance to be sealed.

It is preferable that the resin for constituting capsule walls have softening points within the range of the center value of molding temperatures for the thermosetting resin minus 20° C. to minus 10° C. Examples of such resins are melamine resin, polyacrylonitrile resin, vinylidene chloride-acrylonitrile-methyl methacrylate copolymer resin (having a softening point of 120° to 130° C.) and the like. It is also preferred to prevent the adhesion onto the mirror plate through the use of a resin having a relatively high heat resistance to the capsule wall material.

For the volatile substance to be sealed within the capsule, it is preferred to use a liquid whose boiling point falls within the range of from an upper limit of the center value of the molding temperature for the thermosetting resin to a lower limit of the temperature lower than the center value by 20° C. More specifically, when the thermosetting resin is melamine resin, hydrocarbons such as isobutane, a Freon gas and chloroform, as well as a halogen, tetramethylsilane, a petrolium ether, or the like are preferably used.

The microcapsules are preferably of an outer diameter of 5 to 20 μm and a wall thickness of 2 to 4 μm. More particularly, although microcapsules of a larger outer diameter, a smaller wall thickness, and a larger internal capacity for the liquid in order to obtain a foaming ratio may appear to be preferable, the above mentioned range is preferred from the viewpoint of the formulation of the ink upon forming the heat-foamable printed layer by an ordinary printing method, the storage stability of the ink, the transfer property of the ink from a printing roller to a sheet to be printed, and the like. If larger capsules are produced, the capsule walls become thicker to make the foaming difficult. If the capsule is too small, the wall becomes thinner to lower the gas-barrier property. In regard to the solvent, a solvent that will not cause the wall of the microcapsule type foaming agent to be dissolved or become swollen is preferred. In this respect, an alcohol or water is preferred and an ester or a ketone is not, for example, when the above mentioned vinylidene chloride-acrylonitrile-methyl methacrylate copolymer is used.

Modification 3

As described above, in the present invention, it is preferred for the purpose of forming distinct concavities not to use an overlay paper which has been generally employed in the conventional melamine decorative sheet. Thus, the decorative sheet obtained by the above described fundamental embodiment of the present invention inevitably has lower surface properties such as resistance to abrasion. To solve this problem and provide the decorative sheet with excellent surface properties, the following methods can be applied to the process of the present invention, although all these methods have been developed for the planar or flat thermosetting resin decorative sheets, and the methods themselves are publicly known.

(a) A method of using a suspension prepared by heating cellulose in nitric acid as the thermosetting resin liquid (cf. Japanese Patent Publication No. 21986/1968).

(b) A method of forming a synthetic resin layer containing cellulose microcrystals on an impregnated decorative sheet B and then subjecting it to the molding by heating and pressing as shown in FIG. 3 (cf. Japanese Patent Publication No. 5085/1969).

(c) A method of using a thermosetting resin liquid containing silica powder and microcrystalline cellulose material (cf. Japanese Patent Publication No. 33297/1967).

(d) A method of using a thermosetting resin liquid to which microcrystalline cellulose powder and glass fiber, or microcrystalline asbestos and Aerosil (colloidal silica) have been added (cf. Japanese Patent Publication No. 30635/1972).

(e) A method of using a thermosetting resin liquid to which abrasive grains of alumina, silicon carbide or the like, or a mixture thereof with microcrystalline cellulose have been added by mixing (cf. Japanese Patent Laid-Open Application No. 14587/1974 and No. 96089/1974).

(f) A method of using a paper for decorative use wherein a resin layer containing mineral fine particles having resistance to abrasion has been formed on a printed pattern layer instead of using an overlay paper (cf. Japanese Patent Laid-Open Application No. 92875/1978 and No. 67459/1980).

The disclosures of the above described publications are incorporated herein by reference.

As described above, these methods for improving the surface properties have been developed in connection with the processes for production of planar or flat thermosetting resin decorative sheets. The present invention combines the methods for improving the surface properties with the process for producing the coincidently embossed decorative sheet.

Of the above enumerated methods, the method (f) may be utilized most preferably in the present invention because it produces a decorative sheet having especially excellent surface properties. The method (f) can be applied to the process of the present invention as described in detail below.

Figure 6:
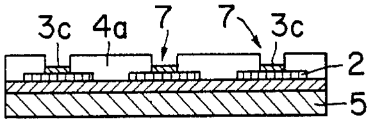
Figure 8:
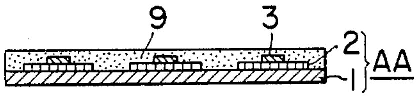
Figure 9:
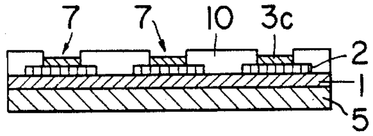

In this embodiment of the invention, instead of the decorative paper A described with reference to FIG. 1, see FIG. 8 wherein a decorative paper AA comprises a resin layer 9 containing fine mineral particles having resistance to abrasion further formed over a paper for decorative use 1, an ordinary printed layer 2, and a foamable printed layer 3, by substantially the same procedure as set forth in the above described fundamental embodiment of the invention shown in FIGS. 2 through 6 is carried out. Thus, a decorative sheet as shown in FIG. 9 corresponding to that of FIG. 6 is obtained. In FIG. 9, the reference numeral 10 designates a composite cured resin layer which has been formed in such a way that a thermosetting resin permeates into the resin layer containing abrasion-resistant mineral particles and is cured.

As the fine mineral particles having resistance to abrasion, alumina, silica, silicon carbide, zirconium oxide, cerium oxide, and the like having particle size of 10 to 50 μm are preferably used. Especially preferred is alumina in view of both hardness and economical cost.

The resin layer 4 containing fine mineral particles can be obtained by applying as coating the paint described below by the gravure coating method, roller coating method, air-knife coating method, or the like and drying. The paint is obtained by mixing and kneading 100 parts of such mineral particles with 25 to 50 parts of a binder resin such as microcrystalline cellulose, acrylic resin, carboxymethylcellulose, methylcellulose, polyvinylalcohol, or polyvinylpyrrolidone, together with water, a solvent or a dispersion medium. A binding promoter such as a silane coupling agent or the like can be added to the paint as necessary, to improve the binding between the fine mineral particles and the thermosetting resin. The coating weight is preferably in the range of about 3 to 10 g/m$^2$ and especially about 3.5 to 5.0 g/m$^2$. When the coating weight is insufficient, it gives rise to poor improvement in the surface properties such as resistance to abrasion. When the coating weight is excessive, it retards the formation of concavities.

As also seen from FIG. 9, the composite cured resin layer 10 containing the fine mineral particles having resistance to abrasion has been removed in the concavities 7. Thus the surface properties are inevitably lowered in these portions. In thermoset resin decorative sheets, however, such partial lack of the surface-protective layer does not matter in general. For example, one of the most attractive patterns for the thermoset resin decorative sheet is a wood grain pattern, and it is often desired to form concavities conicident with the wood vessel pattern especially as in natural wood panels. In this case, because the wood vessel pattern is a minute linear pattern, the lock of the corresponding portions of the protective layer scarcely causes deterioration of the surface properties, especially the resistance to abrasion. Incidentally, because such a resin layer containing fine mineral particles has been partly removed, it is advantageous in that the visual contrast between the concavities and neighboring portions is increased and thus more distinct relief is imparted.

As described above, the printing process to form a decorative paper has been improved over the process for production of conventional thermosetting decorative sheets. In accordacne with the present invention, a concave pattern coincident with the printed pattern can be formed, and also it is possible to form deeper distinct concavities in comparison with the prior process disclosed in Japanese Patent Laid-Open Application No. 111554/1979. Moreover, according to the above described modified processes, a decorative sheet with uniform surface luster can be obtained, and a thermoset resin decorative sheet having excellent surface properties can also be produced.

The nature and utility of the present invention are more fully indicated in the following specific examples of practice.

EXAMPLE 1

A wood grain pattern was gravure printed with an ordinary gravure ink having the following formulation on the surface of a colored paper for decorative use having a basis weight of 80 g/m$^2$.

| Ordinary gravure ink | |
|---|---|
| cellulose acetate | 5 to 6% |
| coloring pigment | 15 to 35% |
| dibutyl phthalate (plasticizer) | 2 to 3% |
| solvent | 56 to 78% |
| methanol | 15 parts |
| ethyl acetate | 60 parts |
| xylene | 15 parts |
| cyclohexanone | 10 parts |

Then, a wood vessel pattern exactly coincident with the wood grain pattern thus obtained was printed by gravure printing with a heat-foamable ink having the following formulation.

| Heat-foamable ink | |
|---|---|
| butyl methacrylate resin | 25% |
| coloring pigment | 5% |
| diphenyloctyl phosphate (plasticizer) | 1% |
| solvent | 49% |
| toluene | 35 parts |
| n-hexane | 45 parts |
| isopropyl alcohol | 20 parts |
| foaming agent (microcapsule foaming agent F-60, supplied by Matsumoto Yushi Seiyaku K. K., Japan) | 20% |

Then, the resulting decorative sheet was impregnated with a thermosetting resin liquid consisting of 50 parts of melamine-formaldehyde resin, 45 parts of water and 5 parts of isopropyl alcohol to a pickup of 90 g/m$^2$ (dry basis) of the melamine resin, by a conventional impregnation apparatus for ordinary diallyl phthalate resin, melamine resin, or the like. The sheet was then dried to obtain an impregnated decorative sheet.

The impregnated decorative sheet was laminated on 4 sheets of core paper. The resulting laminate sheet was sandwiched between a pair of mirror plates and subjected to molding by heating and pressing by means of a heat press under the conditions of 100 kg/cm$^2$, 135° C., and 20 minutes. Thus, a melamine decorative intermediate sheet was obtained in which the portions of the wood vessel pattern were in close coincidence with the wood grain pattern and were matte in comparison with the neighboring portions.

The entire surface of the resulting decorative intermediate sheet was coated with ethyl acetate to a coating weight of about 10 g/m$^2$, and then rubbed by a buff roller. The resulting rubbing dust was removed by a melton roller to obtain a three-dimensional decorative sheet having concave wood vessel pattern portions.

EXAMPLE 2

Onto the decorative sheet obtained by coating with the heat-foamable ink shown in Example 1 was further applied a coating of a resin liquid containing fine alumina particles having the following formulation by an air-knife coating method to a coating weight of 3.5 g/m$^2$ (dry basis), said coating step was followed by drying at 100° C. Thus a decorative sheet was obtained.

| Resin liquid containing fine alumina particles | |
|---|---|
| water | 89.0% |
| alumina (average particle size 30μ) | 7% |
| microcrystalline cellulose | 1.8% |
| silane coupling agent (A-1100, supplied by Nippon Unicar K. K., Japan) | 0.4% |
| carboxymethylcellulose | 0.8% |

Substantially in the same way as in Example 1, a three dimensional decorative sheet was formed by the steps comprising impregnating with the thermosetting resin liquid, laminating on the core paper, molding by heating and pressing, rubbing by a buff roller, and removing the rubbing dust by a melton roller. A three-dimensional decorative sheet was obtained as in Example 1.

The resistance to surface abrasion of the decorative sheet thus obtained was evaluated according to the abrasion testing method for thermosetting resin decorative sheets specified in the Japanese Industrial Standards (JIS). The results of the evaluation are shown in the following table together with those of a high-pressure melamine decorative sheet produced by the use of the conventional overlay sheet.

| Test Pieces | Abrasion value | Abrasion loss |
|---|---|---|
| decorative sheet of Example 2 | 325 times | 0.022 g/100 times |
| decorative sheet having overlay sheet | 300 times | 0.057 g/100 times |

From these results, it can be seen that the melamine decorative sheet in which the resin layer containing fine mineral particles was formed has an excellent three-dimensional pattern embossed in coincidence with the wood grain as well as higher resistance to abrasion than the conventional high-pressure melamine decorative sheet with the overlay sheet bearing only a general planar pattern.

EXAMPLE 3

A decorative sheet was produced in substantially the same way as in Example 1. The resulting decorative sheet was impregnated with a resin liquid prepared with the use of a rapid-drying melamine resin (Suntop M-700 supplied by Nissan Kagaku Kogyo K. K., Japan) to a pickup weight (dry basis) of 108 g/m$^2$ and was then dried. Thus an impregnated sheet was obtained.

The impregnated decorative sheet was superposed on a particle board of 15-mm thickness, which was then subjected to the molding by heating and pressing under the conditions of 20 kg/cm$^2$, 150° C., and 3 minutes. The resulting laminate sheet was then subjected to the coating with a solvent, rubbing, and removal of rubbing dust substantially in the same way as in Example 1. As a result, there was obtained a coincidently embossed low-pressure melamine decorative sheet having three-dimensional concavities and convexities in which the portions of the wood vessel pattern was in coincidence with the ordinary printed layer and was matte in comparison with the neighboring portions.

EXAMPLE 4

A decorative sheet was produced as in Example 1 except that Micropearl RQ-507 supplied by Matsumoto Yushi Seiyaku K. K., Japan, was used as a foaming agent. The resulting decorative sheet was impregnated with a thermosetting resin liquid having the following formulation to a pickup weight (dry basis) of 120 g/m$^2$ and then dried by a hot air dryer having a drying region of 60° to 100° C., to obtain an impregnated decorative sheet.

| Thermosetting resin liquid | |
|---|---|
| diallyl phthalate prepolymer | 100 parts |
| benzoyl peroxide | 3 parts |
| internal releasing agent | 0.5 part |
| polymerization inhibitor (hydroquinone) | 0.01 part |
| methylated silica (particle size 16 mμ) | 3 parts |
| acetone | 150 parts |

The impregnated decorative sheet was superposed on a particle board of 15-mm thickness and then subjected to molding by heating and pressing by the use of mirror-finished duralumin plates under the conditions of 20 kg/cm$^2$, 130° C., and 15 minutes. Thus there was obtained a decorative intermediate sheet in which the wood vessel pattern portions were somewhat matte in comparison with the neighboring portions.

Then, the intermediate sheet was coated with 10 g/m$^2$ of ethyl acetate by means of a roller coater. The surface of the coated sheet was rubbed by a buff roller, and the resulting dust was removed by a melton roller. Thus, there was obtained a three-dimensional coincidently embossed diallyl phthalate decorative sheet having concave vessel pattern portions.

What is claimed is:

1. A process for producing a decorative sheet with a concave pattern coincident with a design or color pattern, which comprises:

forming in sequence on a paper for decorative use a printed layer of ordinary ink having a desired pattern and then a printed layer of heat-foamable ink having a desired pattern thereby forming a layered product;

impregnating the layered product with a thermosetting resin liquid thereby forming a resin layer on the layered product;

drying the layered product with the resin layer thereby forming a dried layered product;

laminating the dried layered product with a substrate thereby forming a laminate sheet;

sandwiching the laminate sheet between a pair of heating plates and molding the laminate sheet by heating and pressing simultaneously curing the thermosetting resin and rendering, the laminate sheet into an integral structure by curing the resin layer, and simultaneously foaming the heat foamable ink by heating and pressing the laminate sheet, thereby forming cells;

coating the laminate sheet with a solvent such that the solvent is absorbed into said cells formed by the heat-foamable ink during the heating and pressing of the laminate and said cells swelling with the solvent, extending beyond the resin layer; and rubbing the laminate sheet to remove said cells swollen by the solvent.

2. The process according to claim 1, in which the foaming agent contained in the heat-foamable printed layer has a foaming temperature range in the vicinity of the molding temperature by heating and pressing.

3. The process according to claim 1, in which the foaming agent contained in the heat-foamable printed layer comprises microcapsules which comprises thermoplastic resin capsules and a vaporizable liquid sealed therein.

4. The process according to claim 1, in which a release paper is superposed on the impregnated decorative sheet before the sandwiching and molding step and the release paper is removed before the application of the solvent.

5. The process according to claim 1, in which the heat-foamable printed layer is prefoamed upon drying of the decorative sheet impregnated with the thermosetting resin liquid.

6. The process according to claim 1, in which the decorative sheet comprises a resin layer containing abrasion-resistant fine mineral particles on the heat-formable printed layer.

7. The process according to claim 6, in which the abrasion-resistant fine mineral particles are alumina particles having a particle size of 10 to 50 $\mu$m.

8. The process according to claim 1, in which the design pattern of the foamed printed layer is a wood vessel pattern.

9. The process according to claim 1, in which the thermosetting resin liquid comprises a melamine resin.

10. The process according to claim 9, in which the molding by heating and pressing is carried out at a temperature of 130° to 140° C., and the foaming agent has a forming temperature in the range of 135° C.±15° C.

* * * * *